United States Patent
Hjelm et al.

(10) Patent No.: US 9,177,336 B2
(45) Date of Patent: *Nov. 3, 2015

(54) APPARATUSES AND METHODS FOR RECOMMENDING A PATH THROUGH AN INFORMATION SPACE

(75) Inventors: Johan Hjelm, Tokyo (JP); Mattias Lidström, Stockholm (SE); Mona Matti, Nacka (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 195 days.

This patent is subject to a terminal disclaimer.

(21) Appl. No.: 13/227,751

(22) Filed: Sep. 8, 2011

(65) Prior Publication Data

US 2013/0067114 A1    Mar. 14, 2013

(51) Int. Cl.
  *G06F 15/173*    (2006.01)
  *G06Q 30/02*    (2012.01)
  *G06Q 50/00*    (2012.01)

(52) U.S. Cl.
  CPC ............ *G06Q 30/0282* (2013.01); *G06Q 50/01* (2013.01)

(58) Field of Classification Search
  CPC .................. G06F 17/30902; G06F 17/30905; G06F 15/173; H04L 67/2823; H04L 41/0253; H04L 67/2842; H04L 67/1097; H04L 63/102; G06Q 30/0282
  USPC .......... 709/204, 223, 224, 238; 707/710, 723, 707/767, 768; 705/319
  See application file for complete search history.

(56) References Cited

U.S. PATENT DOCUMENTS

| | | | |
|---|---|---|---|
| 8,000,726 B2 | 8/2011 | Altman et al. | |
| 8,386,509 B1 * | 2/2013 | Scofield et al. | 707/769 |
| 2004/0054428 A1 | 3/2004 | Sheha et al. | |
| 2005/0073443 A1 | 4/2005 | Sheha et al. | |
| 2008/0132252 A1 | 6/2008 | Altman et al. | |
| 2008/0134042 A1 * | 6/2008 | Jankovich | 715/733 |
| 2009/0182498 A1 | 7/2009 | Seymour | |
| 2009/0259632 A1 * | 10/2009 | Singh | 707/3 |
| 2009/0281724 A1 | 11/2009 | Blumenberg et al. | |
| 2009/0326800 A1 * | 12/2009 | Kalaboukis et al. | 701/201 |
| 2010/0082649 A1 * | 4/2010 | Gutt et al. | 707/758 |
| 2011/0130960 A1 | 6/2011 | Sheha et al. | |
| 2011/0264736 A1 * | 10/2011 | Zuckerberg et al. | 709/204 |
| 2012/0041819 A1 * | 2/2012 | Ramer et al. | 705/14.46 |
| 2012/0082649 A1 * | 4/2012 | Gronthos et al. | 424/93.7 |
| 2012/0137201 A1 * | 5/2012 | White et al. | 715/205 |

OTHER PUBLICATIONS

Goodale, P., et al., The Information School, University of Sheffield, "Paths, Personalising Access to Cultural Heritage Collections using Pathways", presented at PATCH 2011, Feb. 13, 2011, 23 pages.
Office Action issued on Apr. 15, 2013 in co-pending U.S. Appl. No. 13/090,554, 12 pages.

* cited by examiner

*Primary Examiner* — Ario Etienne
*Assistant Examiner* — Kidest Mendaye
(74) *Attorney, Agent, or Firm* — Patent Portfolio Builders, PLLC

(57) ABSTRACT

A recommendation apparatus for determining, for a user, a set of one or more recommended paths through an information space in response to receiving from the user a path request message. Advantageously, in some embodiments, the path recommender apparatus determines a recommended path by analyzing a set of paths, where each path in the set was traversed by a person who is in a "social graph" belonging to the user (e.g., each path in the set was traversed by one of the user's Facebook friends). In this way, paths can be recommended to the user based on paths that are popular with the user's friends.

21 Claims, 8 Drawing Sheets

300

Browse history data structure associated with Person "X" and with information object iObj-n.

| Previous Object | access time | departure time | Next Object | Ratings |
|---|---|---|---|---|
| iObj-1 | 9.00 | 17.00 | iObj-2 | 4 stars |
| iObj-1 | 8.45 | 17.30 | iObj-4 | (well organized and excellent source of information) |
| iObj-3 | 10.30 | 17.00 | iObj-2 | |

APPARATUSES AND METHODS FOR RECOMMENDING A PATH THROUGH AN INFORMATION SPACE

TECHNICAL FIELD

The invention relates to the field of information space traversal.

BACKGROUND

For any given information space (e.g., a set of interconnected information objects, such as, a set of web pages or a set of other interconnected information objects) there usually exists a number of acceptable paths through the information space. For example, there usually exists a number of acceptable paths between any two information objects (i.e., any two "points") in the information space.

As a specific example, consider a person (e.g., Johan) who wants to navigate from a personal finance page on Yahoo (information object A or "point A") to a Britney Spears fan page (information object B or "point B"). While this can be accomplished directly through keyword lookup in an index (using, e.g., a search engine), an alternative is to find a page which connects both to information object A and information object B. While no such direct connection might exist, there is a likelihood that there are connections through several intermediary points in the information space. It is, furthermore, likely that there are several of these intermediary points, and that there can be multiple paths between information objects A and B.

What is desired, therefore, are systems and methods for providing a recommended path through an information space.

SUMMARY

A novel path recommendation apparatus and method is described herein. The path recommendation apparatus, at least in some embodiments, functions to determine, for a user, a set of one or more recommended paths through an information space (e.g., a path going from a starting point in the information space to an ending point in the information space) in response to receiving from the user a path request message. Advantageously, in some embodiments, the path recommender apparatus determines a recommended path by analyzing a set of paths through the information space, where each path in the set was traversed by a person who is in a "social graph" belonging to the user (e.g., each path in the set was traversed by one of the user's Facebook friends). In this way, paths can be recommended to the user based on paths that are popular with the user's friends. If a user were to follow such a recommended path, the probability that the user will run into an information object a friend found interesting will likely be higher than if the user selected a path using some other criteria.

Accordingly, in one aspect, a path recommender apparatus for recommending to a user a path through an information space is provided. In some embodiments, the path recommender apparatus includes a data storage system for storing, for each of a plurality of persons, browse history information associated with the person, where the browse history information may include information identifying information objects that the person has previously browsed (e.g., accessed, retrieved or viewed). The path recommender apparatus also includes a network interface for receiving path request messages. The path recommender apparatus further includes a data processing system configured to perform a path recommendation method in response to the network interface receiving a path request message that was transmitted by a communication device operated by a user, where the path request message requests a recommended path through the information space.

In some embodiments, this path recommendation method includes the steps of: (a) determining a recommended path through the information space, wherein the determining step comprises using at least some of the stored browse history information in determining the recommended path; and (b) using the network interface to transmit to the communication device a path request response message comprising information identifying the determined recommended path. The information identifying the determined recommended path may include information identifying recommended information objects to browse—i.e., iObjs-of-interest. The information identifying the recommended information objects to browse may include information identifying an implicit or explicit rating one of the plurality of persons gave to one of the recommended information objects to browse. In some embodiments, the information identifying the determined recommended path comprises information specifying an ordered set of two more information objects, wherein each information object included in the ordered set of information objects is directly connected to at least one other information object included in the ordered set of information objects.

In some embodiments, the method further includes determining a set of persons who are in a social graph belonging to the user, and the step of using at least some of the stored browse history information in determining the recommended path comprises using only stored browse history information that is associated with a person who is in the user's social graph in determining the recommended path.

In some embodiments, the browse history information associated with one of the plurality of persons includes information identifying information objects the person has previously browsed and may further include the time at which the person browsed those information objects. The browse history information associated with the one of the plurality of persons may further include rating information identifying a rating the person gave to one of the information objects the person visited. In some embodiments, the step of using at least some of the stored browse history information in determining the recommended path includes using the information identifying a path through the information space traversed by said person and the rating information.

In some embodiments, the browse history information associated with one of the plurality of persons further includes time information identifying a time of day at which the person traversed the path. In such embodiments, the method may further include determining the current time of day, and the step of using at least some of the stored browse history information in determining the recommended path comprises using the time information and the determined current time of day in determining the recommended path.

In some embodiments, the data storage system is operable to store preference information belonging to the user, and the step of determining the recommended path further comprises using the preference information in determining the recommended path.

In another aspect, a path recommendation method for recommending a path to a user is provided. In some embodiments, the path recommendation method includes the step of, for each of a plurality of persons, storing browse history information associated with the person, where the browse history information includes information identifying information objects that the person has previously browsed. The method also includes the step of receiving, at a server, a path request message transmitted from a communication device operated by the user, where the path request message requests a recommended path through an information space. The method further includes the step of determining a recommended path through the information space in response to receiving the path request message. This determining step includes using at least some of the stored browse history information in determining the recommended path. The method also includes the step of transmitting, from the server and to the communication device, a path request response message comprising information identifying the determined recommended path.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 3 illustrates an exemplary data structure that may be maintained and used by a path recommender apparatus.

DETAILED DESCRIPTION

Figure 1:
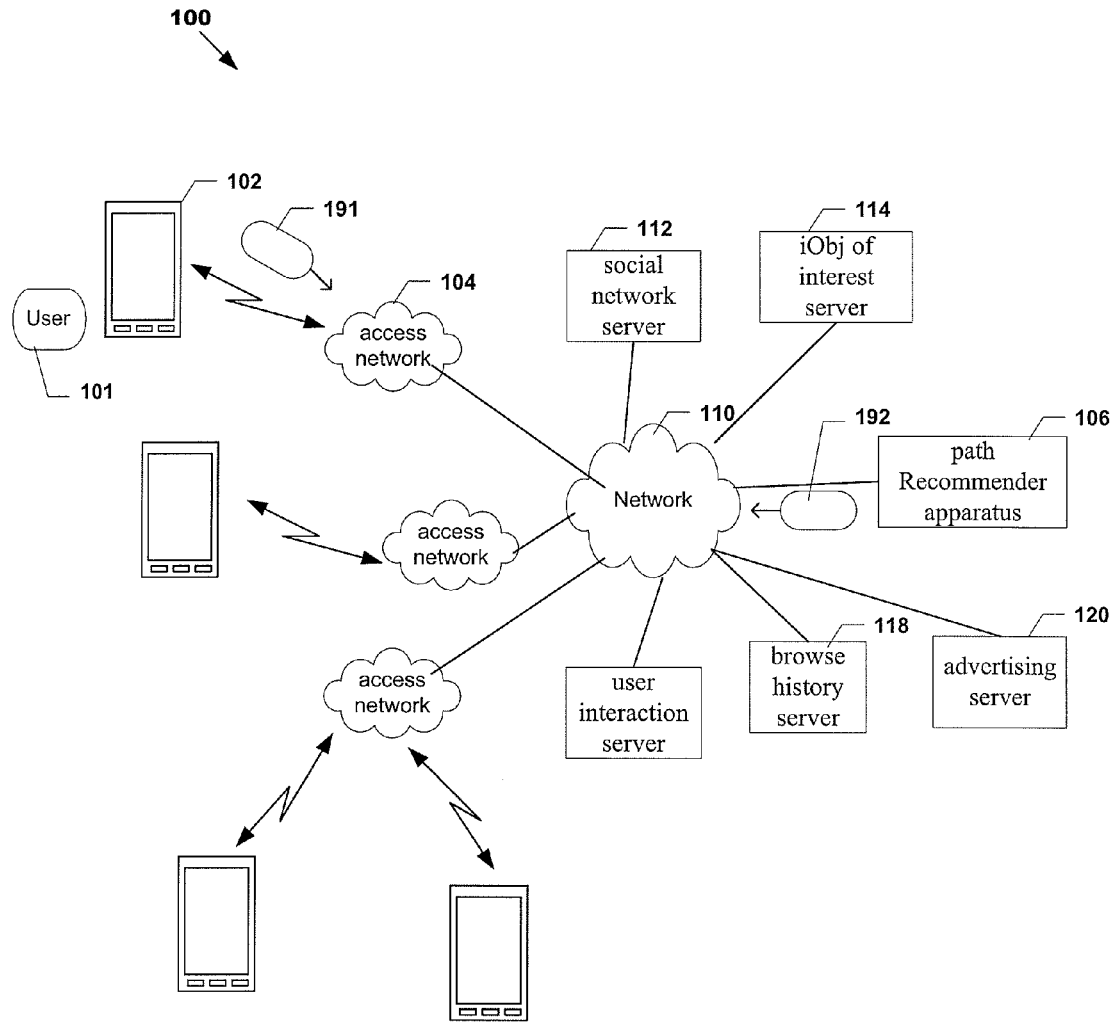
FIG. 1 illustrates a system that includes a novel path recommender apparatus.

Referring now to FIG. 1, FIG. 1 illustrates a system 100 in which a user 101 of a communication device 102 (e.g., mobile terminal, desktop computer, or other device capable of transmitting and receiving data via a network 110) can receive a personalized path recommendation from a path recommender apparatus 106, which may comprise one or more servers. For example, user 101 can use communication device 102 to send to a path recommender apparatus 106 a path request message 191, which requests path recommender apparatus 106 to provide a recommend path through an information space, such as, for example, the World Wide Web, a particular set of web sites, or a single web site. In response to receiving path request message 191, path recommender apparatus 106 may determine a recommended path through the information space and transmit to the user's communication device 102 a path request response message 192, which includes path information identifying (directly or indirectly) the determined recommended path. For example, the path information my indirectly identify the determined path by comprising information (e.g., uniform resource locator (URL)) identifying a web page (or other data set) that includes information directly identifying the determined recommended path. The information directly identifying the determined recommended path may include information specifying an ordered set of two more information objects within the information space, wherein each information object included in the ordered set of information objects is directly connected to at least one other information object included in the ordered set of information objects. Examples of information objects include: web pages, computer files (e.g, .jpg files, .doc files, .mov files), database records, etc.

In determining the recommended path for user 101 in response to receiving path request message 191, path recommender apparatus 106 may use, for each of a plurality of persons, stored browse history information associated with the person. The stored browse history information may identify one or more paths the person has traversed within the last X days, weeks, months, where X>0. Advantageously, in some embodiments, path recommender apparatus 106 determines a recommended path by: (a) determining a set of persons who are in a "social graph belonging to user 101" and (b) for each person included in the determined set, using stored browse history information that is associated with the person in determining the recommended path.

As used herein, a "social graph belonging to user 101" is a set of persons who are directly or indirectly associated with user 101. As an example, persons directly associated with user 101 may include all persons that user 101 has identified as being a friend of user 101, and a person indirectly associated with user 101 may include friends of user 101's friends. As a particular example, if user 101 has a Facebook account, then the social graph belonging to user 101 may include all of persons who are Facebook "friends" with user 101, and, in some embodiments, user 101's social graph may further include all persons who are a Facebook friend with a Facebook friend of user 101. In yet other embodiments, if user 101 has a Twitter account, then user 101's social graph may also include all persons who are user 101's Twitter followers (i.e., are directly associated with user 101 on Twitter). In some embodiments, user 101's social graph may also include persons who share one more traits with user 101 (e.g., age, location, sex, marital status, income, hobbies, preferences). These persons are indirectly associated with user 101.

As a specific example, assume user 101 has sent to path recommender apparatus 106 a path request message 191 requesting a recommended path through an information space (e.g., a particular web site). In response to receiving such a path request message 191, path recommender apparatus 106 may (a) determine persons who are Facebook friends with user 101, (b) for each such person, (b1) retrieve from a browse history information database 202 (see FIG. 2) browse history information associated with the person and (b2) use the retrieved browse history information to determine paths the person took through the information space, (c) use the paths determined in step (b2) to determine a recommended path, and (d) transmit to user 101 a path request response message 192 that includes path information identifying (directly or indirectly) the determined recommended path. In step (c), path recommender apparatus 106 may determine the recommended path by selecting the path that is taken most often (i.e., the most popular path), selecting the shortest path, or selecting the most popular path that includes a particular information object (e.g., web page) because path recommender apparatus 106 stores in a user preference information database 216 (see FIG. 2) preference information for user 101 that indicates that user 101 has an interest in the topic (e.g., finance) to which the particular information object pertains.

As another specific example, assume user 101 has sent to path recommender apparatus 106 a path request message 191 requesting a recommended path from a first information object (e.g. the home page of the Yahoo! website) to a second information object (e.g., the home page of a Britney Spears fan web site). In response to receiving such a path request message 191, path recommender apparatus 106 may (a) determine persons who are Facebook friends with user 101, (b) for each such person, (b1) retrieve from a browse history information database 202 browse history information associated with the person and (b2) use the retrieved browse history information to determine paths the person took through the information space (e.g., the world wide web) in going from the home page of the Yahoo! website to the home page of the Britney Spears fan web site, (c) use the paths determined in step (b2) to determine a recommended path, and (d) transmit to user 101 a path request response message 192 that includes path information identifying (directly or indirectly) the determined recommended path. In step (c), path recommender apparatus 106 may determine the recommended path by selecting the path that is taken most often (i.e., the most popular path), selecting the shortest path, or selecting the most popular path that includes a particular information object (e.g., web page) because path recommender apparatus 106 stores in a user preference information database 216 (see FIG. 2) preference information for user 101 that indicates that user 101 has an interest in the topic (e.g., finance) to which the particular information object pertains.

Figure 2:
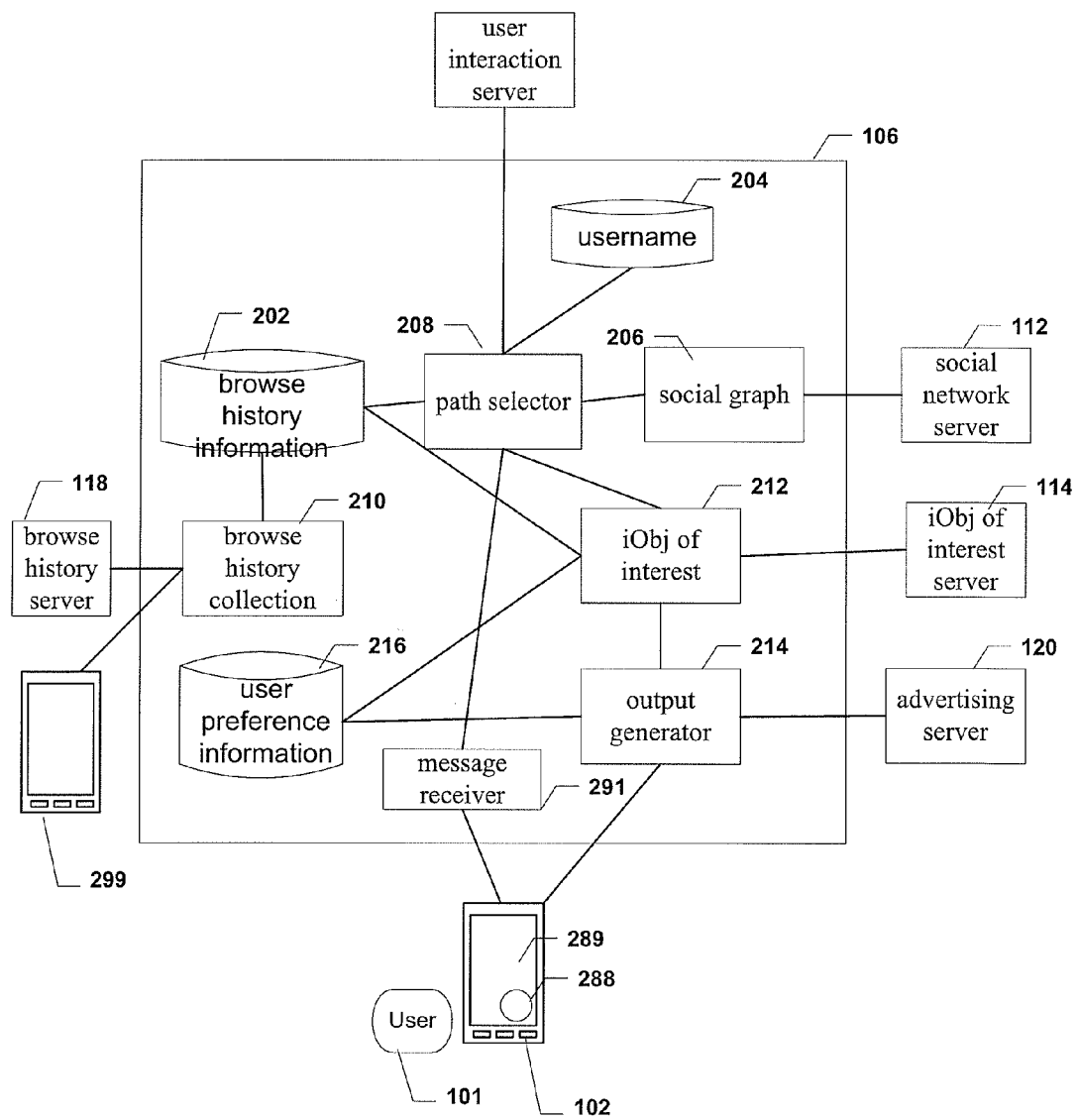
FIG. 2 is a functional block diagram of an exemplary path recommendation apparatus.

Referring now to FIG. 2, FIG. 2 is a functional block diagram of an embodiment of path recommender apparatus 106. As illustrated in FIG. 2, path recommender apparatus 106 includes a message receiver 291 for receiving messages from user 101's communication device 102 (e.g. for receiving a path request message 191). In response to receiving a path request message 191 transmitted from user 101's communication device 101, message receiver 291 may pass to path selector 208 information identifying user 101 (e.g., a mobile identification number (MIN) of communication device 102), which information may have been included in path request message 191 and information identifying an information space, which information may also have been part of path request message 191. In some embodiments, path request message 191 may also or alternatively include information identifying a starting information object and an ending information object between which user 101 is requesting a recommended path.

Path selector 208 may use the information identifying user 101 to obtain one or more other user identifiers associated with user 101. For example, path selector 208 may use the information identifying user 101 to obtain user 101's user identifier and password for each of user 101's Facebook, Twitter, LinkedIn, etc. accounts. This information may be maintained in username database 204, which may include one or more tables mapping information identifying user 101 with a set of one or more user identifiers and passwords belonging to user 101 for external social networking systems.

The obtained user identifiers may then be used by a social graph module 206 to determine a social graph belonging to user 101. Social graph module 206 may determine at least a part of user 101's social graph by transmitting to an external social network server 112 (e.g., a Facebook server or a LinkedIn server) a request message for the purpose of obtaining from server 112 the identities (e.g., names or user identifiers) of people that are directly and indirectly associated with user 101. For instance, if server 112 is a Facebook server, then the request message may include user 101's Facebook user identifier and may request server 112 to transmit to social graph module 206 a response message containing a list of user 101's Facebook friends and a list of the people that are friends with user 101's Facebook friends.

In response to social graph module 206 determining user 101's social graph, or portion thereof, (i.e., determining persons that are directly or indirectly associated with user 101), path selector 208, for each person included in at least a subset of the persons that were determined to be directly or indirectly associated with user 101, obtains from browse history information database 202 browse history information associated with the person so that path selector 208 can determine paths the person has traversed through the information space.

Referring now to FIG. 3, FIG. 3 illustrates a representative example browse history data structure 300 from browse history information database 202 that stores browse history information for a particular person (i.e. person X). More specifically, browse history data structure 300 stores person X's browse history information for a particular information object (e.g., iObj-n) (e.g., the home page of a particular web site). In the illustrated example, browse history data structure 300 is in the form of a table having a five columns. Each time person X browses (e.g., accesses) information object iObj-n, a row may be added to table 300. This function may be performed by browse history collection module 210. Browse history collection module 210 may, at any point in time, request an external browser history server 118 to provide information identifying person X's current browser history. Browse history server 118 may be a browse history server operated by a mobile network operator. However, in some embodiments, browse history collection module 210 may receive person X's browser history from communication device 102, which person X uses to browse the information space.

In any event, browse history collection module 210 may be configured to periodically (e.g., every 5 minutes, 30 minutes, 2 hours, etc) obtain person X's (as well as a plurality of other persons') current browser history to determine whether person X has browsed any information objects since the last time module 210 obtained person X's current browser history. If module 210 determines that person X has browsed an information object since the last time module 210 obtained person X's current browser history, then module 210 may modify one or more tables like that shown in FIG. 3 or create a table like that shown in FIG. 3 for the current information object, if such a table does not exist. As shown in FIG. 3, the table may include the following fields: (1) a previous object field 301 for storing information identifying the information object person X browsed just prior to browsed iObj-n, (2) an access time field 302 for storing information identifying the time at which person X's accessed iObj-n, (3) a departure time field 303 for storing information identifying person X's departure time from the current information object, (4) a next object field 304 for storing information identifying the information object person X browsed at after departing the current information object, and (5) a rating information field 305 for storing information identifying a rating person X gave to the current information object. For example, if the current information object is a coffee shop web page, person X may rate the coffee shop web page using a rating application (e.g., Yelp).

Because browse history information database 202 may contain, for each of a plurality of persons, a table, like table 300, for each information object the person browses, information database 202 contains information identifying paths that each of the plurality of persons has traversed through an information space. Thus, when user 101 requests a recommended path, path selector 208 can use information obtained from social graph module 206 (e.g., the list of user 101's "friends") and from browse history information database 202 to determine paths traversed by user 101's friends. With this path information in hand, path selector 208 can perform any one of a variety of algorithms to determine a recommended path using, among other things, the obtained path information for the people within user 101's social graph. For example, in some embodiments, path selector 208 may use a well known "ant colony optimization (ACO)" algorithm.

After determining a recommended path, path selector 208 may provide information identifying the determined recommended path to information object-of-interest (iObj-of-interest) module 214, which may be configured to determine recommended iObj s-of-interest for user 101 that are on the recommended path. For example, using browse history information from browse history information database 202, iObj-of-interest module 214 may be able to determine that many of the people within user 101's social graph who traverse the recommended path regularly interact with a particular iObj on the path that provides information on a particular topic (e.g., sports). Additionally, iObj-of-interest module 214 may be able to determine from information stored in user preference information database 216 that user 101 is a sports lover. Using this information, iObj-of-interest module 214 can be configured to conclude that the particular iObj is a recommended iObj for user 101 and add to the information identifying the determined recommended path iObj information for one or more of the recommended iObj s-of-interest on the path.

In some embodiments, in response to determining that a particular iObj is an iObj-of-interest for user 101, iObj-of-interest module 214 may transmit to an iObj-of-interest server 114 a request message identifying the determined particular iObj and requesting information concerning the iObj. For example, if the iObj is a page mentioning Justin Timberlake, then iObj-of-interest server 114 may respond to the request message by transmitting to iObj-of-interest module 212 a response message containing information about the page. In response to receiving the information about the page, iObj-of-interest module 212 may add the information about the page to the information identifying the determined recommended path that was received from path selector 208. iObj-of-interest module 212 may then pass the updated information identifying the determined recommended path to an output generator 214

In response to receiving from iObj module 212 the updated information identifying the determined recommended path, output generator 214 may request from an advertising server 120 an advertisement to include with the information received from iObj module 212. Additionally, output generator 214 may be configured to obtain user 101's display preferences from user preference information database 216 and format the information received from iObj module 212 in a display format preferred by user 101. Once the information received from iObj module 212 (i.e., the information identifying the determined recommended path and any iObj information) has been formatted, output generator 214 transmits to user 101's communication device 102 the path request response message 192 discussed above. After receiving path request response message 192, a path recommender application 288 executing on user 101's communication device 102 may display on a display 289 of communication device 102 a map of the information space with the determined recommended path and any of the iObj s-of-interest determined by iObj module 212 highlighted so that user 101 can easily see the recommended path and iObj s-of-interest along that path.

In some embodiments, in response to a path request message, path selector 208 may determine a set of recommended paths instead of a single recommended path and the path request response message 192 may include, for each recommended path, path information identifying the determined recommended path.

Figure 4:
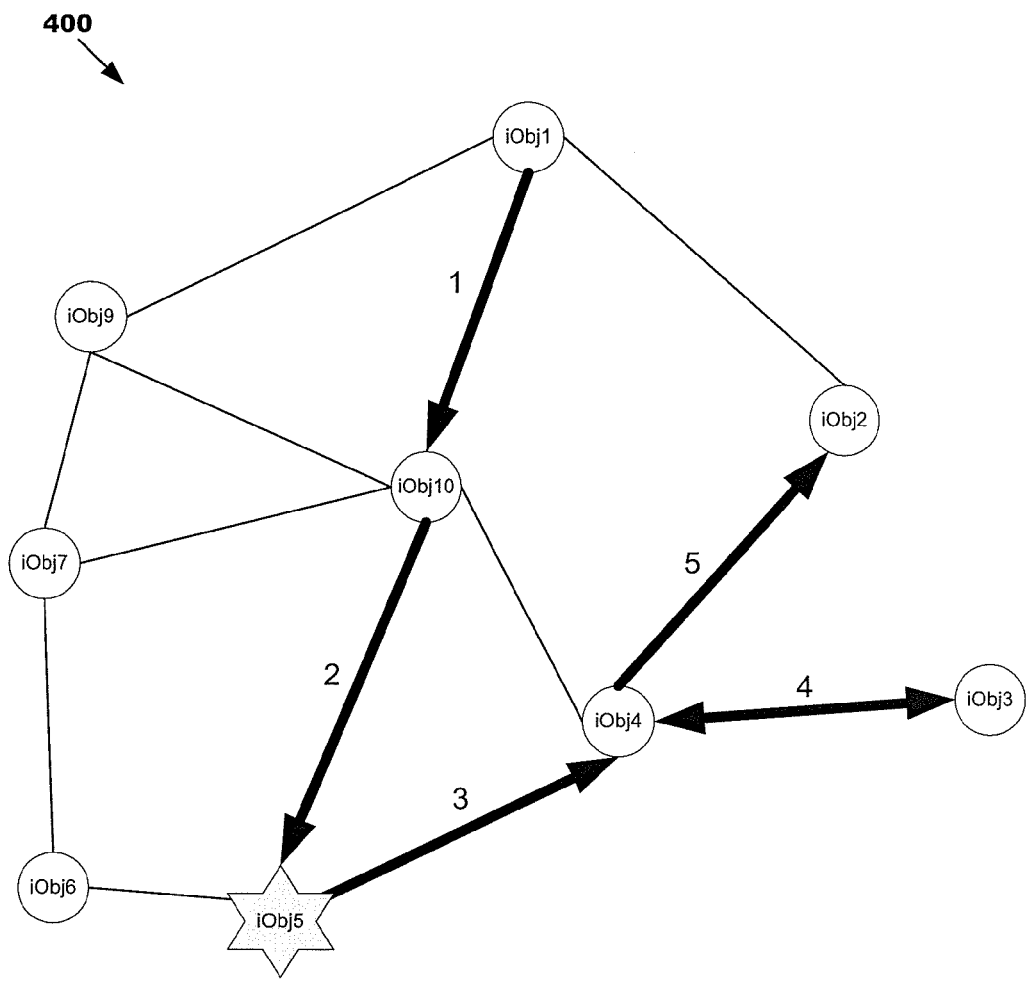
FIG. 4 illustrates an example user interface for displaying a recommended path.

Referring now to FIG. 4, FIG. 4 illustrates an example map 400 of an information space (or portion thereof) that may be displayed on display 289 of user 101's communication device 102 in response to path recommender application 288 receiving a path request response message 192 that includes path information for each of a plurality of recommended paths determined by path recommender apparatus 106. In the example shown in FIG. 4, path recommender apparatus 106 has determined a single recommended path through the information space. The path begins at iObj1, the proceeds to the following iObjs in this order: iObj10, iObj5, iObj4, iObj3, and iObj2. Because iObj3 is not connected to iObj2, the path has the user going back from iObj3 to iObj4 so that the user can access iObj2, which is connected to iObj4. The star shaped objects represent determined iObj s-of-interest. In some embodiments, user 101 can obtain information about a particular iObj represented by one of the star shaped objects by selecting (e.g., clicking on or tapping) the star shaped object. This information about the particular iObj may have been included in the path request response message 192.

In some embodiments, after path recommender apparatus 106, in response to a path request message 191 received from user 101's communication device 102, determines a set of one or more recommended paths and transmits a path request response message 192 to communication device 102, path recommender apparatus 106 may periodically (and automatically) update the set of recommended paths and transmit to communication device 102 updated path information. For example, after path recommender apparatus 106 determines an initial set of one or more recommended paths in response to receiving a path request message 191, path recommender apparatus 106 may periodically determine whether paths should be added and/or removed from the initial set of recommended paths and also whether iObj s-of-interest should be added and/or removed from a path included in the initial set of recommended paths.

For example, if path recommender apparatus 106, based on browse history information from browse history information database 202, determines that one of the paths that was initially recommended is no longer being used by user 101's friends (or is being used only infrequently), the path recommender apparatus 106, in response to this determination, may transmit to communication device 102 a message indicating that the path is no longer a recommended path. As another example, if path recommender apparatus 106, based on browse history information from browse history information database 202, determines that at least a certain percentage of the persons in user 101's social graph who traverse a path included in the initial set of paths stop at a new location located on the path, then path recommender apparatus 106, in response to this determination, may transmit to communication device 102 a message indicating that the path has a new iObj and including information pertaining to this new point of interest (e.g., its location, among other things) so that when user 101 uses path recommender application 288 to view the path, path recommender application 288 can display on the path a star shaped object correspond to the newly discovered point of interest.

Figure 5:
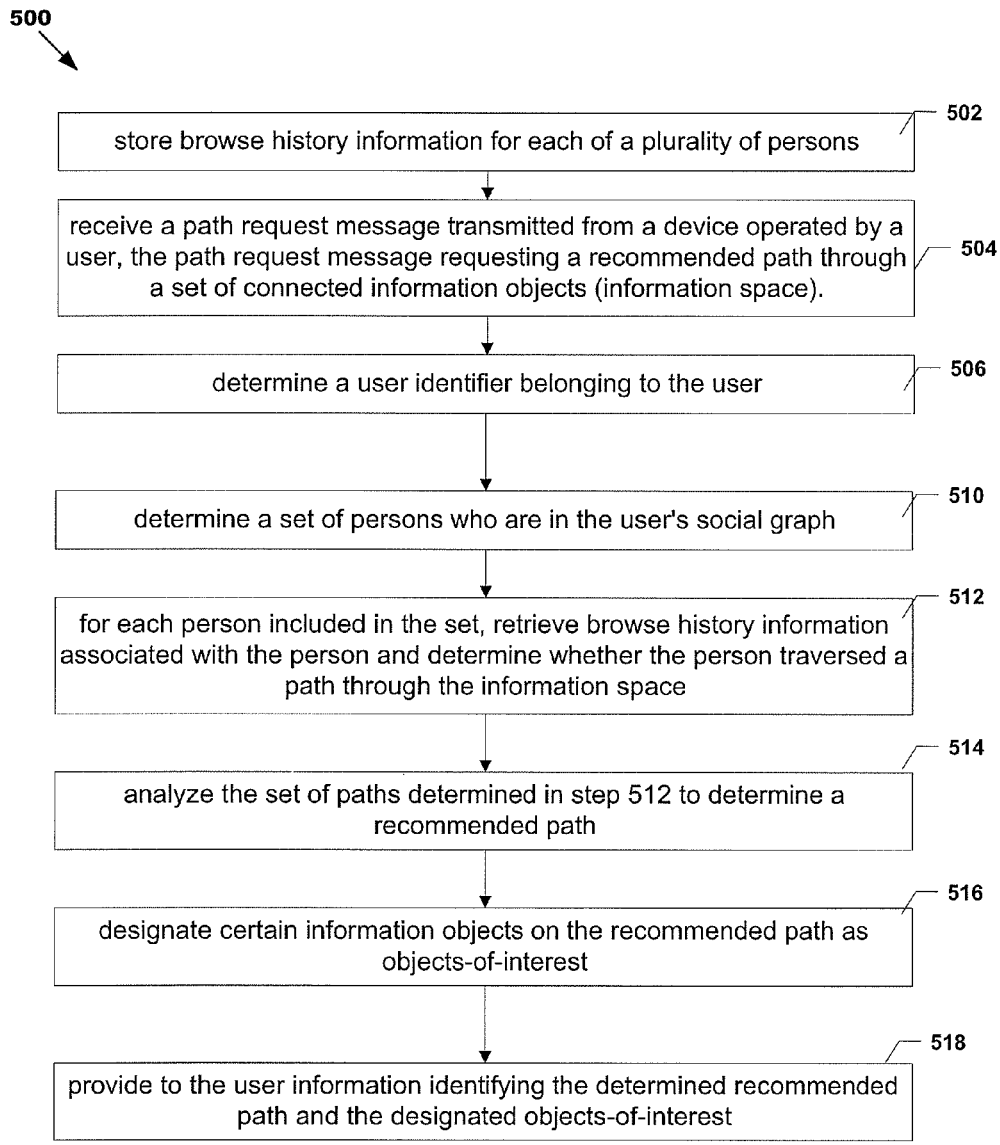
FIG. 5 is a flow chart illustrating a processes according to an embodiment.

Referring now to FIG. 5, FIG. 5 is a flow chart illustrating a process 500, according to an embodiment, that may be performed by path recommender apparatus 106. Process 500 may begin in step 502, where path recommender apparatus 106 stores in browse history information database 202 browse history information for each of a plurality of persons. We shall assume that each of the plurality of persons has consented to path recommender apparatus 106 collecting, storing, and using this personal browse history information. As discussed above, path recommender apparatus 106 may include a browse history collection module 210 for performing this function.

In step 504, path recommender apparatus 106 receives from user 101's communication device 102 a path request message 191. The path request message identifies an information space and/or a starting location (i.e., starting information object) and requests a recommended path through the information space (e.g., a recommended path starting with the starting location). In some embodiments, the path request message may identify a starting information object and an ending information object and request a pateht from the starting to the ending object.

In step 506, path recommender apparatus 106 determines a user identifier for user 101. For example, path recommender apparatus 106 may determine the MIN of communication device 102 or the path request message 191 itself may contain the user identifier for user 101.

In step 510, path recommender apparatus 106 uses the user identifier determined in step 506 to determine a set of persons who are in user 101's social graph. As described above, path recommender apparatus 106 may include a username database that maps the user identifier determined in step 506 with a set of one or more other user identifiers (e.g., user 101's Facebook user identifier) that can be used to obtain a list of persons who are directly or indirectly associated with user 101.

In step 512, for each person included in the set of persons determined in step 510, path recommender apparatus 106 retrieves browse history information associated with the person and, using the retrieved browse history information, determines whether the person traversed a path through the information space (or, in other embodiments, traversed a path going from the starting to the ending information object). That is, in step 512, path recommender apparatus 106 determines a set of paths through the information space, where each path in the set was traversed by at least one of the persons included in the set of persons determined in step 510.

In some embodiments, in step 512, path recommender apparatus 106 takes into account the current time of day and the times that the determined paths were traversed. For example, in some embodiments, path recommender apparatus 106 includes in the determined set of paths only those paths that were traversed at about the same time of day as when the path request message was received. So, for example, if the path request message is received in the morning, path recommender apparatus 106 will include in the set of determined paths only those paths that were traversed in the morning time. As illustrated in FIG. 3, browse history information database 202 stores time information from which one may determine the time a particular person traversed a particular path.

In step 514, path recommender apparatus 106 analyzes the set of paths determined in step 512 to determine a set of one or more recommended paths.

In step 516, path recommender apparatus 106 designates certain information objects on a recommended path as iObjs-of-interest In step 518, path recommender apparatus 106 provides to user 101 (e.g., transmits to user 101's communication device 102) information identifying the determined recommended path(s) and the designated iObj s-of-interest.

Figure 6:
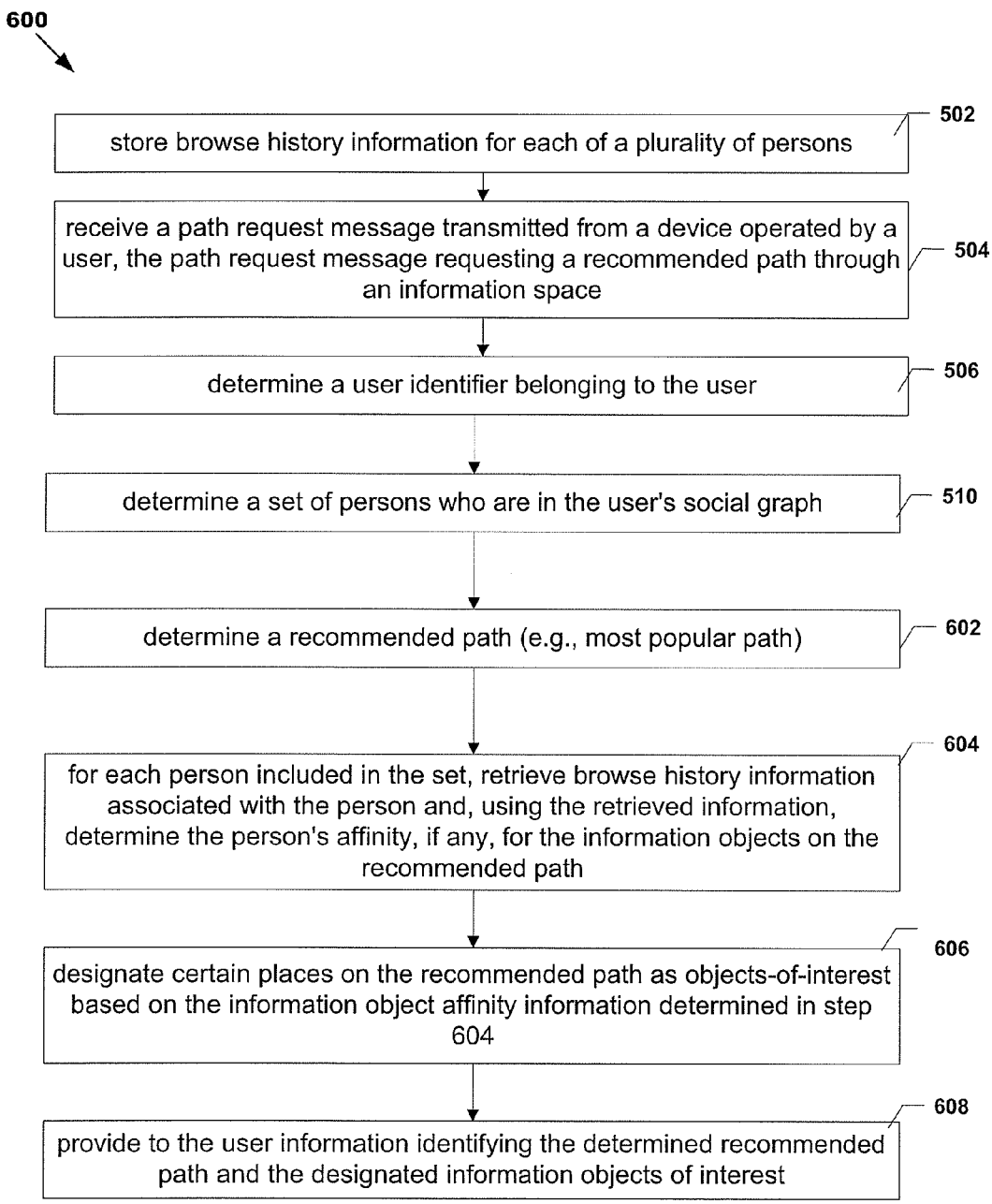
FIG. 6 is a flow chart illustrating a processes according to an embodiment.

Referring now to FIG. 6, FIG. 6 is a flow chart illustrating a process 600, according to an embodiment, that may be performed by path recommender apparatus 106. As shown, the first four steps of process 600 are the same as the first four steps of process 500. That is, process 600 may being with step 502 and proceed to steps 504, 506 and 510, which steps are described above.

In step 602, path recommender apparatus 106 determines a recommended path. For example, in embodiments where the user is requesting a recommend path from a starting to an ending information object, in step 602, path recommender apparatus 106 may use conventional algorithms to determine the shortest path from the starting to the ending information object.

In step 604, for each person included in the set of persons determined in step 510, path recommender apparatus 106 retrieves browse history information associated with the person and, using the retrieved browse history information, determines the person's affinity, if any, for the information objects on the recommended path. There are several way that path recommender apparatus 106 can determine the person's affinity for an information object. First, if the person has rated the information object (e.g., given the information object four out four stars), then path recommender apparatus 106 can determine the person's affinity simply by determining the rating the person gave to the information object. Another way path recommender apparatus 106 can determine the person' affinity for an information object is to determine how often the person has browsed the information object within some arbitrary period of time (e.g., the last six months). If the person browses the information object every day, that is an indication that the person has a high liking for (i.e., affinity for) the information object, whereas if the person visited the information object only once and never returned, then that is an indication that the person has no or low affinity for the information object.

In step 606, path recommender apparatus 106 designates certain information objects on the recommended path as iObjs-of-interest based on the affinity information determined in step 604. For example, if path recommender apparatus 106 determines that several of the people within user 101's social graph have a high affinity for a particular information object on the recommended path, then path recommender apparatus 106 may designate that place as an iObj-of-interest.

In step 608, path recommender apparatus 106 provides to user 101 (e.g., transmits to user 101's communication device 102) information identifying the determined recommended path(s) and the designated iObj s-of-interest.

Figure 7:
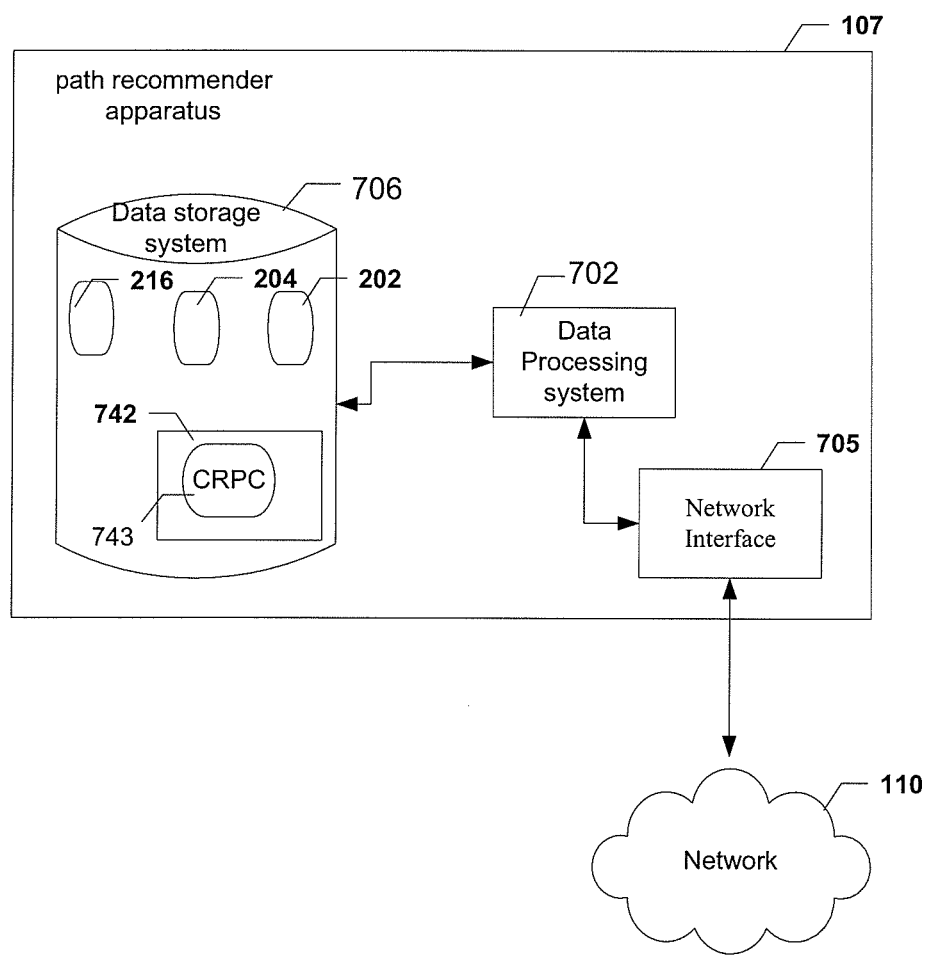
FIG. 7 is a block diagram of a particular embodiment of a path recommender apparatus.

Referring now to FIG. 7, FIG. 7 illustrates a block diagram of path recommender apparatus 106 according to some embodiments of the invention. As shown in FIG. 7, path recommender apparatus 106 may include: a data processing system 702, which may include one or more microprocessors and/or one or more circuits, such as an application specific integrated circuit (ASIC), Field-programmable gate arrays (FPGAs), etc; a network interface 705 for receiving messages (e.g., path request messages 191 transmitted from a communication device 102); data storage system 706, which may include one or more non-volatile storage devices and/or one or more volatile storage devices (e.g., random access memory (RAM)). As shown, data storage system 706 may be used to store browse history information database 202, user preference information database 216 and username database 204. In embodiments where data processing system 702 includes a microprocessor, computer readable program code 743 may be stored in a computer readable medium 742, such as, but not limited, to magnetic media (e.g., a hard disk), optical media (e.g., a DVD), memory devices (e.g., random access memory), etc. In some embodiments, computer readable program code 743 is configured such that when executed by a processor, code 743 causes path recommender apparatus 106 to perform steps described above (e.g., steps describe above with reference to the flow chart shown in FIGS. 5 and 6). In other embodiments, path recommender apparatus 106 is configured to perform steps described above without the need for code 743. That is, for example, data processing system 702 may consist merely of one or more ASICs. Hence, the features of the present invention described above may be implemented in hardware and/or software. For example, in particular embodiments, the functional components of path recommender apparatus 106 described above may be implemented by data processing system 702 executing computer instructions 743, by data processing system 702 operating independent of any computer instructions 743, or by any suitable combination of hardware and/or software.

Figure 8:
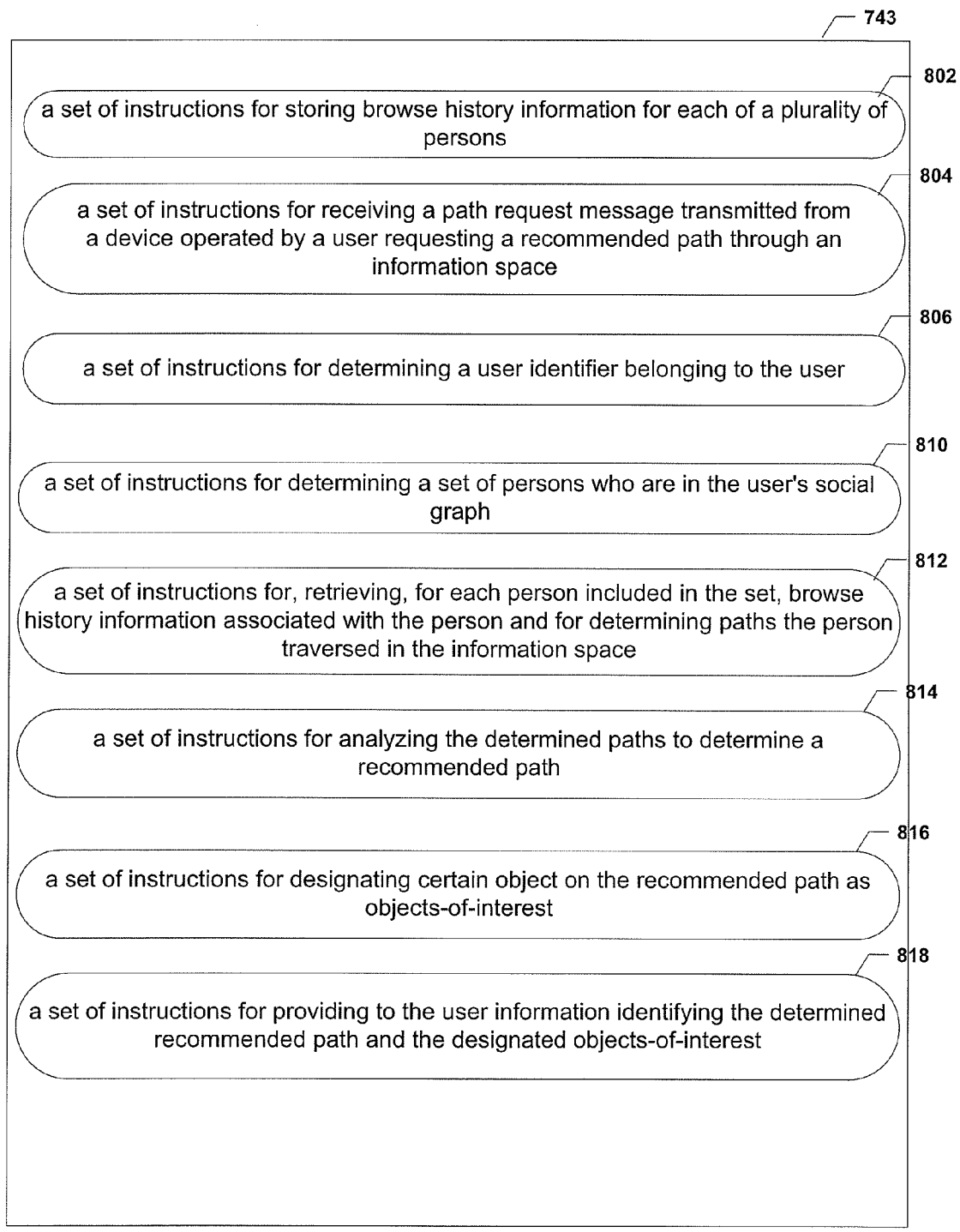
FIG. 8 is a block diagram illustrating example software components of a path recommender apparatus.

Referring now to FIG. 8, FIG. 8 illustrates an embodiment of computer readable program code (CRPC) 743. In the embodiment shown, CRPC 743 includes: (1) a set of instructions 802 for storing browse history information for each of a plurality of persons, (2) a set of instructions 804 for receiving a path request message transmitted from a device operated by a user, the path request message requesting a recommended path through an information space, (3) a set of instructions 806 for determining a user identifier belonging to the user, (4) a set of instructions 810 for using the determined user identifier to determine a set of persons who are in the user's social graph, (5) a set of instructions 812 for retrieving, for each person included in the set of persons, browse history information associated with the person and for determining whether the person traversed a path the information space (i.e., instructions for determining a set of paths through the information space, where each path in the set was traversed by at least one of the persons included in the set of persons), (6) a set of instructions 814 for analyzing the determined set of paths to determine a recommended path, (7) a set of instructions 816 for designating certain information objects on the determined recommended path as information objects-of-interest, and (8) a set of instructions 818 for providing to the user information identifying the determined recommended path and the designated iObjs-of-interest.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A path recommendation apparatus for recommending to a user a path through an information space comprising a plurality of interconnected information objects, comprising:
a data storage system for storing, for each of a plurality of persons, browse history information associated with the person, the browse history information comprising information identifying information objects that the person has previously browsed;
a network interface for receiving path request messages; and
a data processing system configured to perform a method in response to the network interface receiving a path request message that was transmitted by a communication device operated by the user, where the path request message requests a recommended path through the information space, the method comprising:
determining a set of persons who are in a social graph belonging to the user, said set of persons including a first person who is a different person than the user;
determining the recommended path through the information space wherein the determining step comprises using at least some of the stored browse history information in determining the recommended path, wherein at least a portion of said stored browse history information that is used in determining the recommended path comprises stored browse history information that identifies a set of two or more information objects that said first person has previously browsed; and
using the network interface to transmit to the communication device a path request response message comprising information identifying the determined recommended path, wherein
the step of determining the recommended path further comprises:
forming a set of two or more candidate paths using at least some of the stored browse history information;
determining which of said candidate paths included in said set includes an information object providing information on a predetermined specific topic;
forming from the set of candidate paths a subset of candidate paths such that each candidate path included in the subset of candidate paths includes an information object providing information on the predetermined specific topic; and
selecting the recommended path from the subset of candidate paths.

2. The apparatus of claim 1, wherein the browse history information associated with one of the plurality of persons includes information identifying information objects the person has previously browsed.

3. The apparatus of claim 2, wherein the browse history information associated with the one of the plurality of persons further comprises rating information identifying a rating said person gave to one of the information objects.

4. The apparatus of claim 3, wherein the step of using at least some of the stored browse history information in determining the recommended path comprises using information identifying the path through the information space that was traversed by said person and said rating information.

5. The apparatus of claim 1, wherein the browse history information associated with one of the plurality of persons further comprises time information identifying a time of day at which said person traversed the path through the information space.

6. The apparatus of claim 5, wherein
the method comprises determining the current time of day; and
the step of using at least some of the stored browse history information in determining the recommended path comprises using said time information and said determined current time of day in determining the recommended path.

7. The apparatus of claim 1, wherein
the data storage system is operable to store preference information belonging to the user; and
the step of determining the recommended path further comprises using the preference information in determining the recommended path.

8. The apparatus of claim 1, wherein
the information identifying the determined recommended path comprises information specifying an ordered set of two or more web pages, wherein each web page included in the ordered set of web pages is directly connected, via a hypertext link, to at least one other web page included in the ordered set of web pages, and
the information identifying the determined recommended path further comprises information identifying recommended web pages to browse.

9. The apparatus of claim 8, wherein
the information identifying recommended web pages to browse includes information identifying a rating one of the plurality of persons gave to the one of the recommended web pages to browse.

10. A path recommendation method for recommending to a user a path through an information space comprising a plurality of interconnected information objects, comprising:
for each of a plurality of persons, storing browse history information associated with the person, the browse history information comprising information identifying information objects that the person has previously browsed;
determining a set of persons who are in a social graph belonging to the user, said set of persons including a first person who is a different person than the user;
receiving, at a server, a path request message transmitted from a communication device operated by the user, the path request message requesting a recommended path through the information space;
in response to receiving the path request message, determining the recommended path through the information space, wherein the determining step comprises using at least some of the stored browse history information in determining the recommended path, wherein at least a portion of said stored browse history information that is used in determining the recommended path comprises stored browse history information that identifies a set of two or more information objects that said first person has previously browsed; and
transmitting, from the server and to the communication device, a path request response message comprising information identifying the determined recommended path, wherein
the step of determining the recommended path further comprises:
forming a set of two or more candidate paths using at least some of the stored browse history information;
determining which of said candidate paths included in said set includes an information object providing information on a predetermined specific topic;
forming from the set of candidate paths a subset of candidate paths such that each candidate path included in the subset of candidate paths includes an information object providing information on the predetermined specific topic; and
selecting the recommended path from the subset of candidate paths.

11. The method of claim 10, wherein the browse history information associated with one of the plurality of persons comprises information identifying information objects the person browsed.

12. The method of claim 11, wherein the browse history information associated with the one of the plurality of persons further comprises rating information identifying a rating said person gave to one of the information objects.

13. The method of claim 12, wherein the step of using at least some of the stored browse history information in determining the recommended path comprises using information identifying the path through the information space traversed by said person and said rating information.

14. The method of claim 10, wherein the browse history information associated with one of the plurality of persons further comprises time information identifying a time of day at which said person traversed said path.

15. The method of claim 14, wherein
the method further comprises determining the current time of day; and
the step of using at least some of the stored browse history information in determining the recommended path comprises using said time information and said determined current time of day in determining the recommended path.

16. The method of claim 10, wherein
the method further comprises storing preference information belonging to the user; and
the step of determining the recommended path further comprises using the preference information in determining the recommended path.

17. The method of claim 10, wherein
the information identifying the determined recommended path comprises information specifying an ordered set of two or more information objects, wherein each information object included in the ordered set of information objects is directly connected to at least one other information object included in the ordered set of information objects, and
the information identifying the determined recommended path further comprises information identifying recommended information objects to browse.

18. The method of claim 17, wherein
the information identifying recommended information objects to browse includes information identifying a rating one of the plurality of persons gave to the one of the recommended information objects to browse.

19. A path recommendation apparatus for recommending to a user a path through an information space comprising a plurality of interconnected information objects, comprising:
a data storage system for storing, for each of a plurality of persons, browse history information associated with the person, the browse history information comprising information identifying information objects that the person has previously browsed;
a network interface for receiving path request messages; and
a data processing system configured to perform a method in response to the network interface receiving a path request message that was transmitted by a communication device operated by a user, where the path request message requests a recommended path through the information space, the method comprising:
determining a set of persons who are in a social graph belonging to the user, said set of persons including a first person who is a different person than the user;

determining the recommended path through the information space wherein the determining step comprises using at least some of the stored browse history information in determining the recommended path, wherein at least a portion of said stored browse history information that is used in determining the recommended path comprises stored browse history information that identifies a set of two or more information objects that said first person has previously browsed; and using the network interface to transmit to the communication device a path request response message comprising information identifying the determined recommended path, wherein the information identifying the determined recommended path comprises information specifying an ordered set of two or more information objects, wherein each information object included in the ordered set of information objects is directly connected to at least one other information object included in the ordered set of information objects, and the information identifying the determined recommended path further comprises information identifying recommended information objects to browse wherein the recommended information objects to browse are identified as being relevant to the user independent of the received path request message, wherein the step of determining the recommended path further comprises:

forming a set of two or more candidate paths using at least some of the stored browse history information;

determining which of said candidate paths included in said set includes an information object providing information on a predetermined specific topic;

forming from the set of candidate paths a subset of candidate paths such that each candidate path included in the subset of candidate paths includes an information object providing information on the predetermined specific topic; and selecting the recommended path from the subset of candidate paths.

20. A path recommendation method for recommending to a user a path through an information space comprising a plurality of interconnected information objects, comprising:

for each of a plurality of persons, storing browse history information associated with the person, the browse history information comprising information identifying information objects that the person has previously browsed;

determining a set of persons who are in a social graph belonging to the user, said set of persons including a first person who is a different person than the user;

receiving, at a server, a path request message transmitted from a communication device operated by the user, the path request message requesting a recommended path through the information space;

in response to receiving the path request message, determining the recommended path through the information space, wherein the determining step comprises using at least some of the stored browse history information in determining the recommended path, wherein at least a portion of said stored browse history information that is used in determining the recommended path comprises stored browse history information that identifies a set of two or more information objects that said first person has previously browsed; and transmitting, from the server and to the communication device, a path request response message comprising information identifying the determined recommended path, wherein the information identifying the determined recommended path comprises information specifying an ordered set of two or more information objects, wherein each information object included in the ordered set of information objects is directly connected to at least one other information object included in the ordered set of information objects, and the information identifying the determined recommended path further comprises information identifying recommended information objects to browse wherein the recommended information objects to browse are identified as being relevant to the user independent of the received path request message, wherein the step of determining the recommended path further comprises:

forming a set of two or more candidate paths using at least some of the stored browse history information;

determining which of said candidate paths included in said set includes an information object providing information on a predetermined specific topic;

forming from the set of candidate paths a subset of candidate paths such that each candidate path included in the subset of candidate paths includes an information object providing information on the predetermined specific topic; and selecting the recommended path from the subset of candidate paths.

21. The path recommendation method of claim 10, further comprising determining the predetermined specific topic based on user preference information indicating that the user has an interest in the predetermined specific topic.

* * * * *